(12) United States Patent
Middlehurst et al.

(10) Patent No.: US 6,317,311 B1
(45) Date of Patent: Nov. 13, 2001

(54) PLUGGABLE CIRCUIT BREAKER MOUNTING SYSTEM

(75) Inventors: Richard J. Middlehurst; Donald E. Wood, both of Fremont; Jason S. Sloey, Rancho Cucamonga, all of CA (US)

(73) Assignee: TVM Group, Inc., Fremont, CA (US)

( * ) Notice: Subject to any disclaimer, the term of this patent is extended or adjusted under 35 U.S.C. 154(b) by 0 days.

(21) Appl. No.: 09/145,922

(22) Filed: Sep. 3, 1998

Related U.S. Application Data

(60) Provisional application No. 60/057,453, filed on Sep. 3, 1997, and provisional application No. 60/068,357, filed on Dec. 19, 1997.

(51) Int. Cl.[7] .................................................. H02B 1/04
(52) U.S. Cl. ........................ 361/637; 361/644; 361/648; 361/652
(58) Field of Search .................................... 361/627, 633, 361/636–639, 644, 648–650, 652, 673, 822, 823; 439/110

(56) References Cited

U.S. PATENT DOCUMENTS

| | | | |
|---|---|---|---|
| D. 366,239 | 1/1996 | Eaton | D13/146 |
| D. 366,241 | 1/1996 | Eaton | D13/147 |
| D. 366,454 | 1/1996 | Eaton | D13/147 |
| D. 368,071 | 3/1996 | Eaton | D13/147 |
| D. 372,220 | 7/1996 | Matthews | D13/133 |
| D. 372,222 | 7/1996 | Matthews | D13/154 |
| D. 405,417 | 2/1999 | Matthews | D13/147 |
| D. 408,361 | 4/1999 | Chau et al. | D13/147 |
| D. 408,789 | 4/1999 | Middlehurst et al. | D13/154 |
| D. 409,576 | 5/1999 | Wood et al. | D13/154 |
| 3,328,647 * | 6/1967 | Gryctko | 361/644 |
| 4,662,706 | 5/1987 | Foley | 339/256 |
| 4,749,357 | 6/1988 | Foley | 439/80 |
| 4,824,380 | 4/1989 | Matthews | 439/78 |
| 4,854,899 | 8/1989 | Matthews | 439/724 |
| 5,055,055 | 10/1991 | Bakker | 439/78 |
| 5,124,883 | 6/1992 | Bakker | 361/386 |
| 5,431,576 | 7/1995 | Matthews | 439/247 |
| 5,575,690 | 11/1996 | Eaton | 439/717 |
| 5,575,691 | 11/1996 | Matthews | 439/744 |
| 5,591,039 | 1/1997 | Matthews | 439/181 |
| 5,676,571 | 10/1997 | Matthews | 439/843 |
| 5,807,120 | 9/1998 | Matthews | 439/80 |
| 6,002,580 * | 12/1999 | Levantine et al. | 361/644 |

* cited by examiner

*Primary Examiner*—Gregory Thompson
(74) *Attorney, Agent, or Firm*—Flehr Hohbach Test Albritton & Herbert LLP

(57) ABSTRACT

Contact bands for electrically connecting pluggable circuit breakers to ground and to distribution wires in a wiring system are housed in respective housings for protection. The housings are mounted on modular circuit breaker bus bar assemblies adapted to pluggably receive the pluggable circuit breakers, which have posts for pluggably engaging associated contact bands.

23 Claims, 20 Drawing Sheets

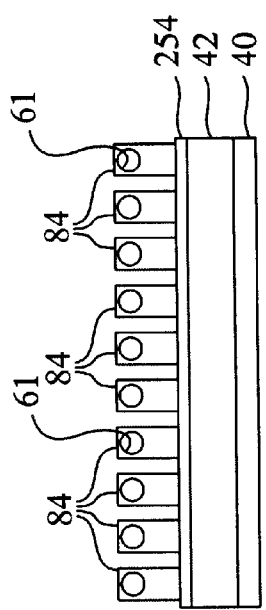
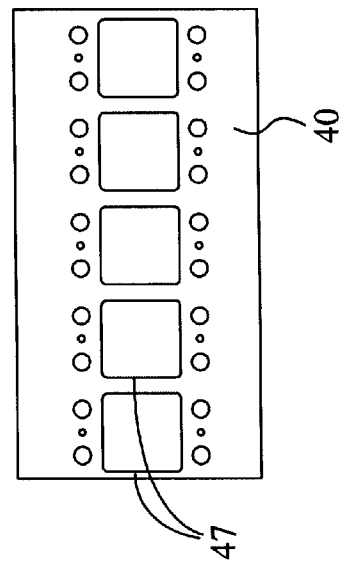
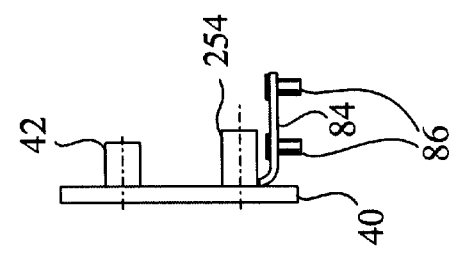
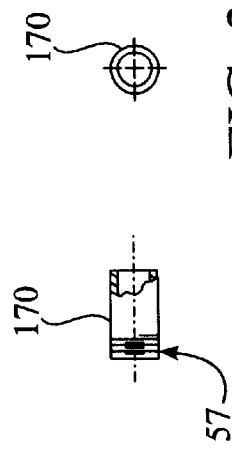

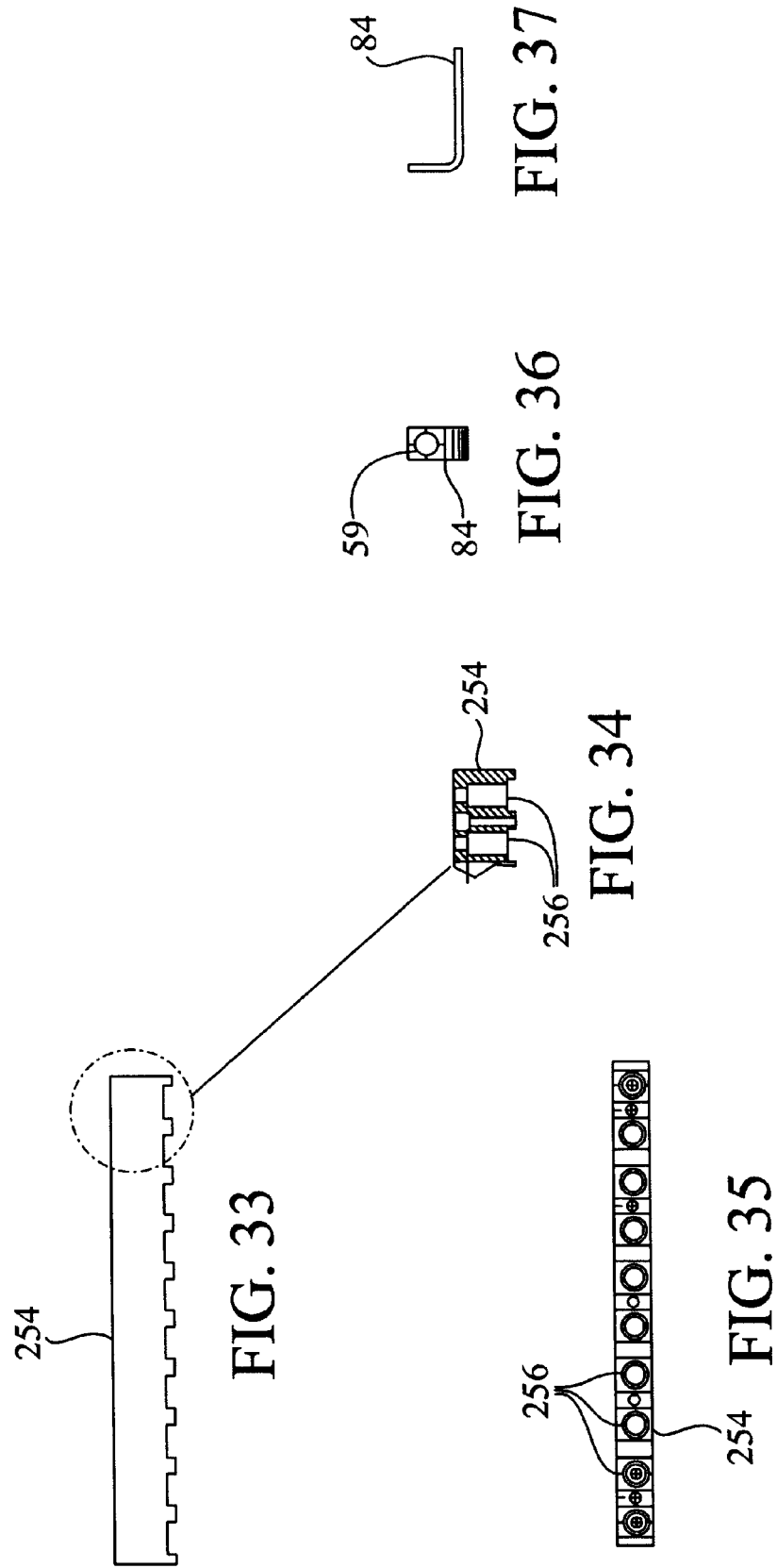

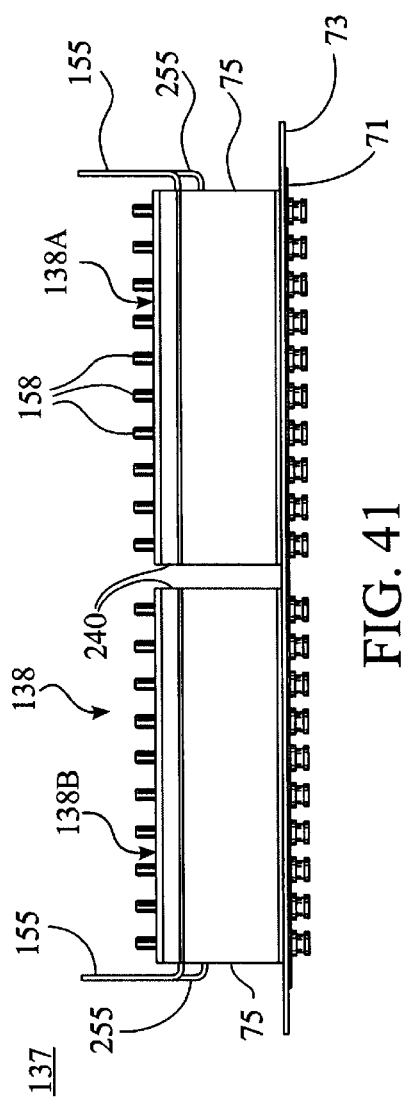
FIG. 41
FIG. 42
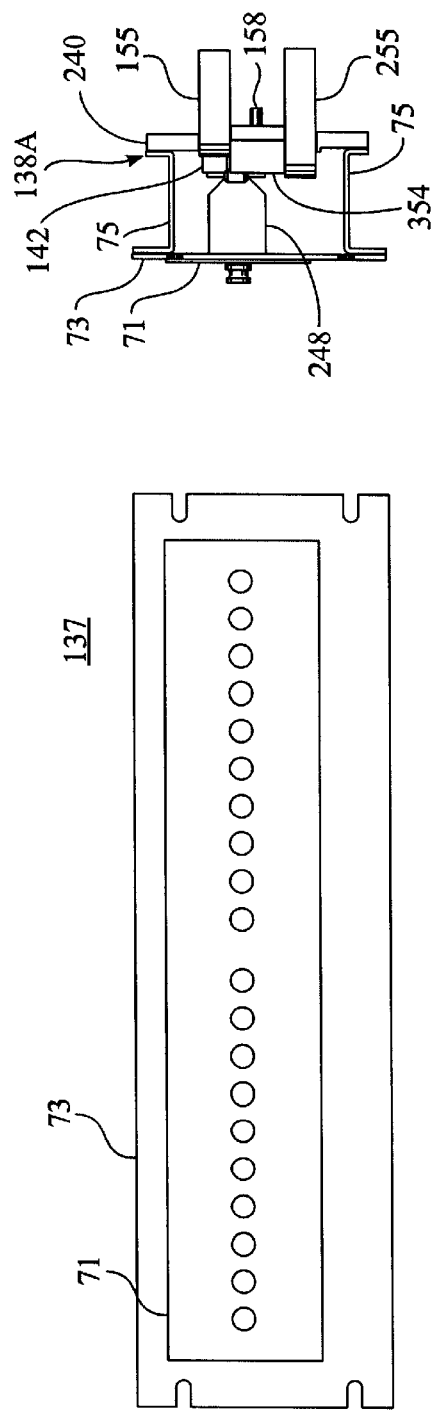
FIG. 43

PLUGGABLE CIRCUIT BREAKER MOUNTING SYSTEM

This application claims the benefit of U.S. Provisional Application No. 60/057,453, filed Sep. 3, 1997 and U.S. Provisional Application No. 60/068,357, filed Dec. 19, 1997.

BACKGROUND OF THE INVENTION

1. Field of the Invention

The present invention relates generally to pluggable circuit breakers, and particularly to a method and apparatus for mounting pluggable circuit breakers in a power distribution system.

2. Description of Related Art

Illustrated in FIG. 1 is a prior art pluggable circuit breaker 30, having two circuit breaker posts 32 (only one shown) and a signaling module 33 having pins 35 for providing signals indicative of the status of the circuit breaker 30—that is, whether the circuit breaker has been tripped or not. To create a pluggable circuit breaker, internally threaded circuit breaker pins 34 are threaded onto each of the threaded circuit breaker posts 32. On the exterior of each circuit breaker pin 34 is attached a resilient electrical contact band 36. The electrical contact band 36 is typically a thin metallic band with resilient fingers having an arcuate configuration and extending outward from the circuit breaker pin outer diameter. The addition of the circuit breaker pins 34 with outer electrical contact bands 36 to the circuit breaker 30 allows for pluggability of the circuit breaker 30 into a circuit breaker panel (not shown). Although this prior art configuration has some advantages, the outer electrical contact bands 36 are known to become damaged, loosened, or become completely removed from the pin 34. In addition, there are many inherent costs in placing the electrical contact band 36 on the circuit breaker pin 32 which results in the circuit breaker going from a relatively economical, throw-away part to a more expensive part.

As a result of these limitations and disadvantages, there is a long-felt need in the art for a more robust, versatile, and cost effective design for pluggable circuit breakers and circuit breaker panels.

SUMMARY OF THE INVENTION

The present invention provides a pluggable circuit breaker mounting system in which electrical contact bands are protected within a housing. In addition, the present invention provides convenient modularity in the design of the circuit breaker panel and the attendant electrical contacts thereto.

In an arrangement in accordance with the preferred embodiment of the invention, the mounting system comprises one or more electrically connected circuit breaker bus bar assemblies, with each assembly comprising a panel having first and second housings mounted thereon. The housings each correspond to a post of a pluggable circuit breaker, the posts plugging into first and second contact bands respectively mounted in the first and second housings. A third contact band is also mounted in the second housing co-extensively with the second contact band, and the two contact bands in the second housing may be supported electrically and structurally within the second housing by a conductive sleeve.

In an arrangement in accordance with a second embodiment of the invention, the sleeve is replaced by a pin contact having a socket portion and a post portion, with only a second contact band, housed in the socket portion, being used in addition to the contact band in the first housing.

In an arrangement in accordance with a third embodiment of the invention, the sleeve which houses the second contact band is electrically connected to a one or more posts mounted outside the second housing to thereby provide electrical access to the second contact band and the second post of the circuit breaker from the exterior of the second housing.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 28 is a top plan view of the circuit breaker bus bar assembly of FIG. 27;

FIG. 29 is a front elevational view of the circuit breaker bus bar assembly of FIG. 27;

FIG. 30 is a right side elevational view of the circuit breaker bus bar assembly of FIG. 27;

FIG. 31 is a partial cut-away view of a sleeve of the circuit breaker bus bar assembly of FIG. 27;

FIG. 32 is a transverse cross-sectional view of the sleeve of FIG. 31;

FIG. 33 is top plan view of the insulating housing of the circuit breaker bus bar assembly of FIG. 27;

FIG. 34 is a partial cross-sectional view of the insulated housing of FIG. 33;

FIG. 35 is a front elevational view of the insulating housing of FIG. 33;

FIG. 36 is a front elevational view of an L-bracket of the circuit breaker bus bar assembly of FIG. 27;

FIG. 37 is a right side elevational view the L-bracket of FIG. 36;

FIG. 41 is a top plan view of the circuit breaker bus bar assemblies of FIG. 38;

FIG. 42 is a front elevational view of the circuit breaker bus bar assemblies of FIG. 38; and FIG. 43 a right side elevational view of the circuit breaker bus bar assemblies of FIG. 38.

DESCRIPTION OF THE PREFERRED EMBODIMENTS

Figure 6:
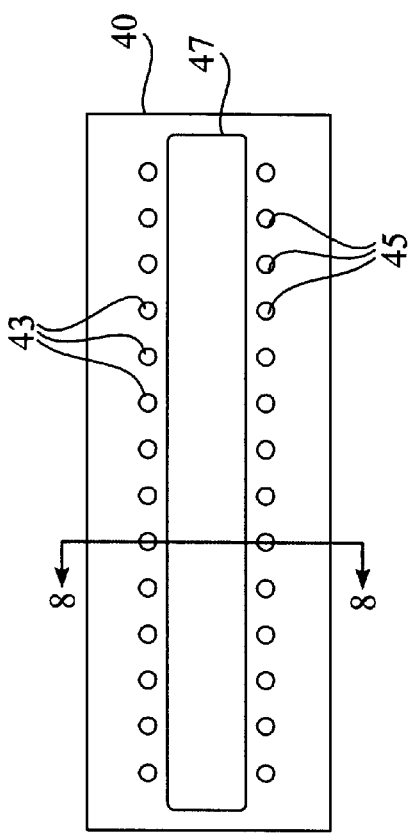
FIG. 6 is a front elevational view of the circuit breaker panel assembly of FIG. 3.

Illustrated in FIGS. 2–15 is a modular circuit breaker mounting system 37 comprising a circuit breaker bus bar assembly 38A in accordance with the preferred embodiment of the invention. The circuit breaker bus bar assembly 38A provides for modularity and pluggability of a set of circuit breakers 48 and their attendant contacts and comprises a circuit breaker panel 40 formed of an insulating material such as any known polymer or other electrically non-conducting material used in electrical applications. Circuit breaker panel 40 is substantially planar in shape and is provided with a plurality of holes 43, 45 (see FIGS. 3 and 6) extending therethrough and arranged in two rows along the length of slot 47 also formed in circuit breaker panel 40. Slot 47 is optional and serves to provide access to signaling pins which may be provided in the pluggable circuit breakers 48 as discussed below.

Figure 1:
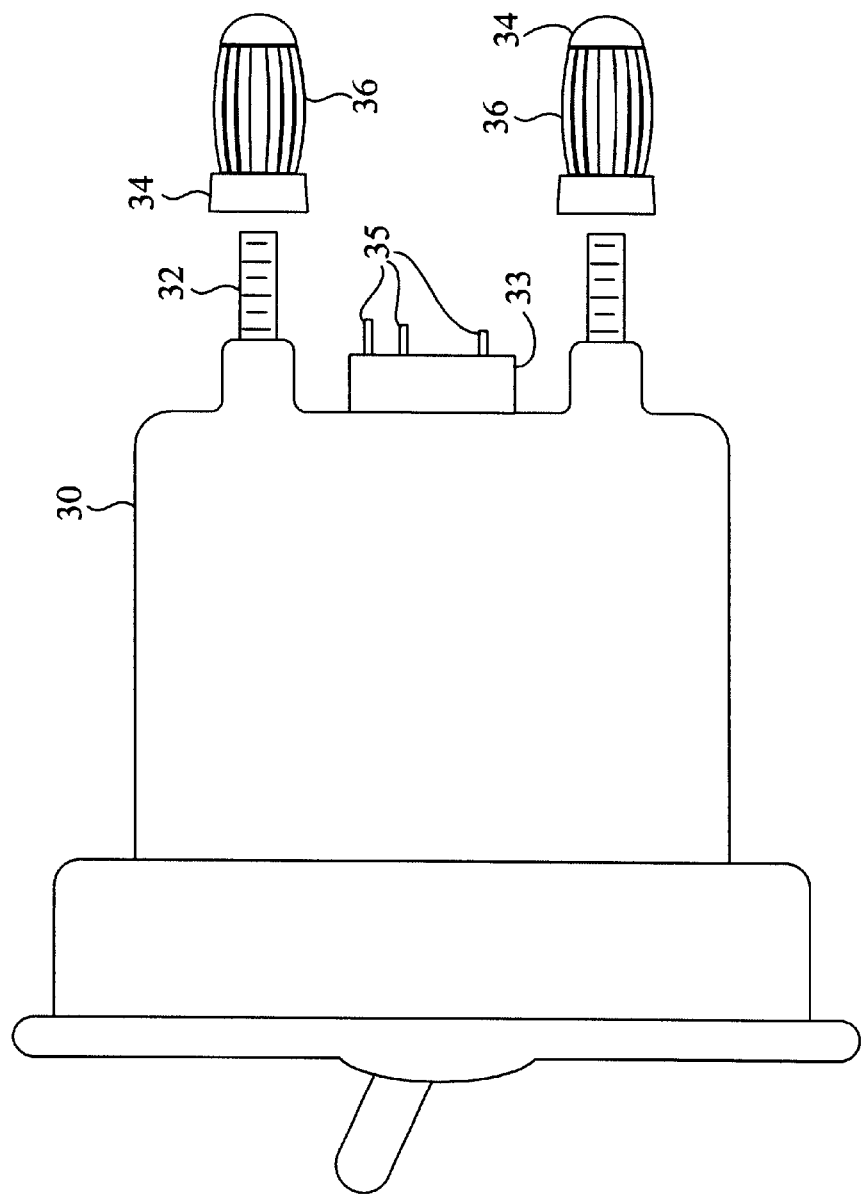
FIG. 1 is a schematic diagram of a prior art pluggable circuit breaker.
Figure 2:
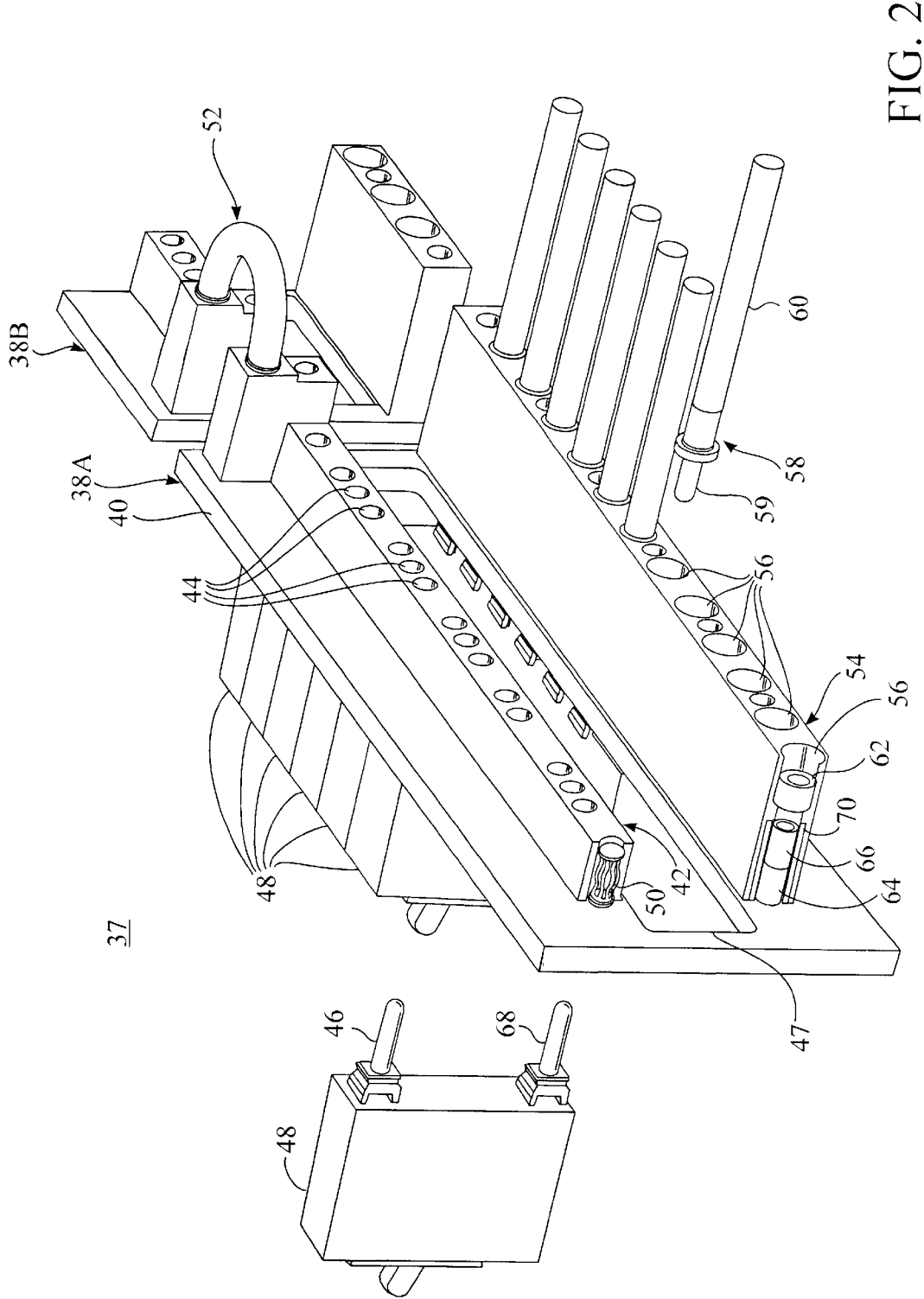
FIG. 2 is a rear perspective view of a modular, pluggable circuit breaker mounting system in accordance with the preferred embodiment of the invention.
Figure 3:
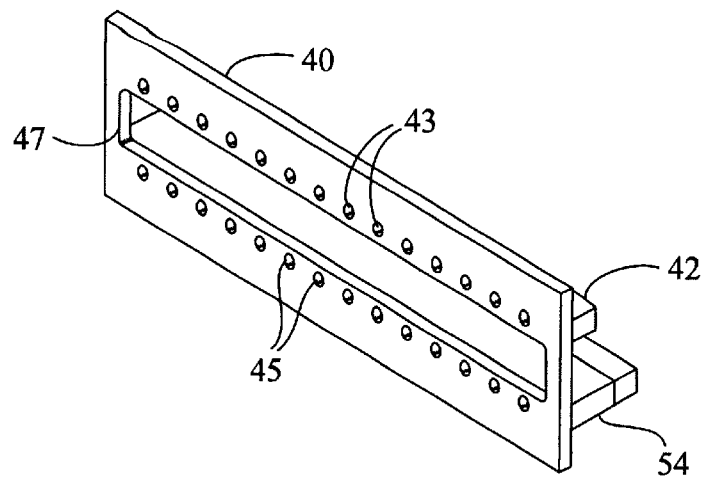
FIG. 3 is a front perspective view of the circuit breaker panel assembly of FIG. 2.

Attached to the rear side of circuit breaker panel 40 is a common or ground bus bar 42 having a plurality of contact openings 44 in registration with holes 43 for pluggably receiving the corresponding post 46 of each of the circuit breakers 48 upon its passage through a hole 43. Located within each of the contact openings 44 are electrical contact bands 50 (FIG. 4) for making electrical contact with post 46. Ground bus bar 42 is of an electrically conducting material, such as for example copper, and serves to commonly connect posts 46 of the circuit breakers 48, via the corresponding contact bands 50, to electrical ground. Only shown partially in FIG. 2 is a second circuit breaker bus bar assembly 38B, associated with a second set of circuit breakers, which can be attached to the first circuit breaker bus bar assembly 38A to be in electrical communication therewith using coupling wire and assembly 52.

Figure 10:
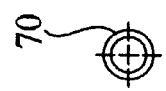
FIG. 10 is a transverse cross-sectional view of the conducting sleeve of FIG. 9.
Figure 9:
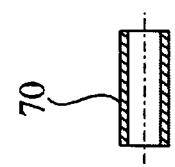
FIG. 9 is a longitudinal cross-sectional view of a conducting sleeve in accordance with the invention.
Figure 11:
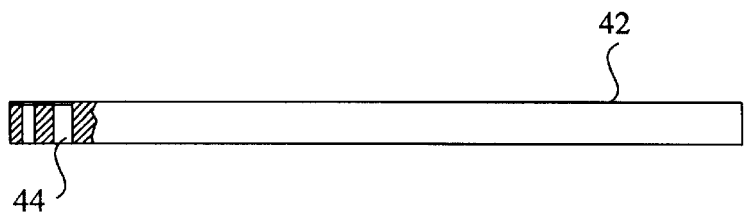
FIG. 11 is a top plan partial cross-sectional view of the ground bus bar of FIG. 3.
Figure 12:
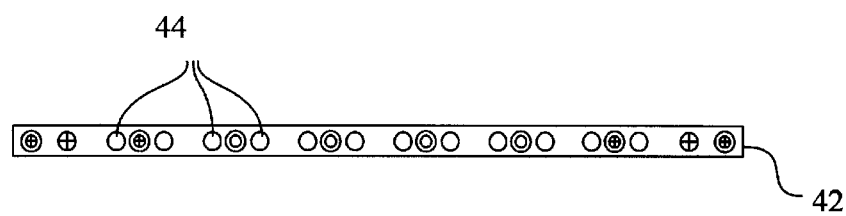
FIG. 12 is a front elevational view of a ground bus bar of FIG. 3.
Figure 13:
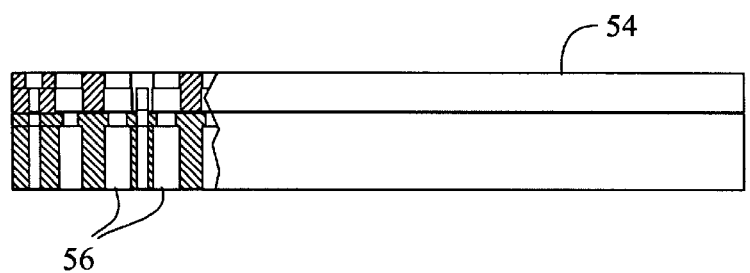
FIG. 13 is a top plan partial cross-sectional view of an insulated housing of FIG. 3.
Figure 14:
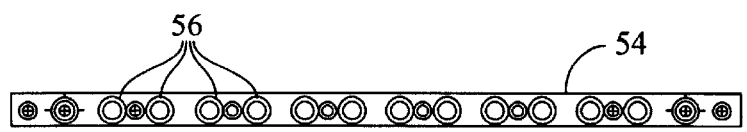
FIG. 14 is a front elevational view of the insulated housing of FIG. 3.
Figure 15:
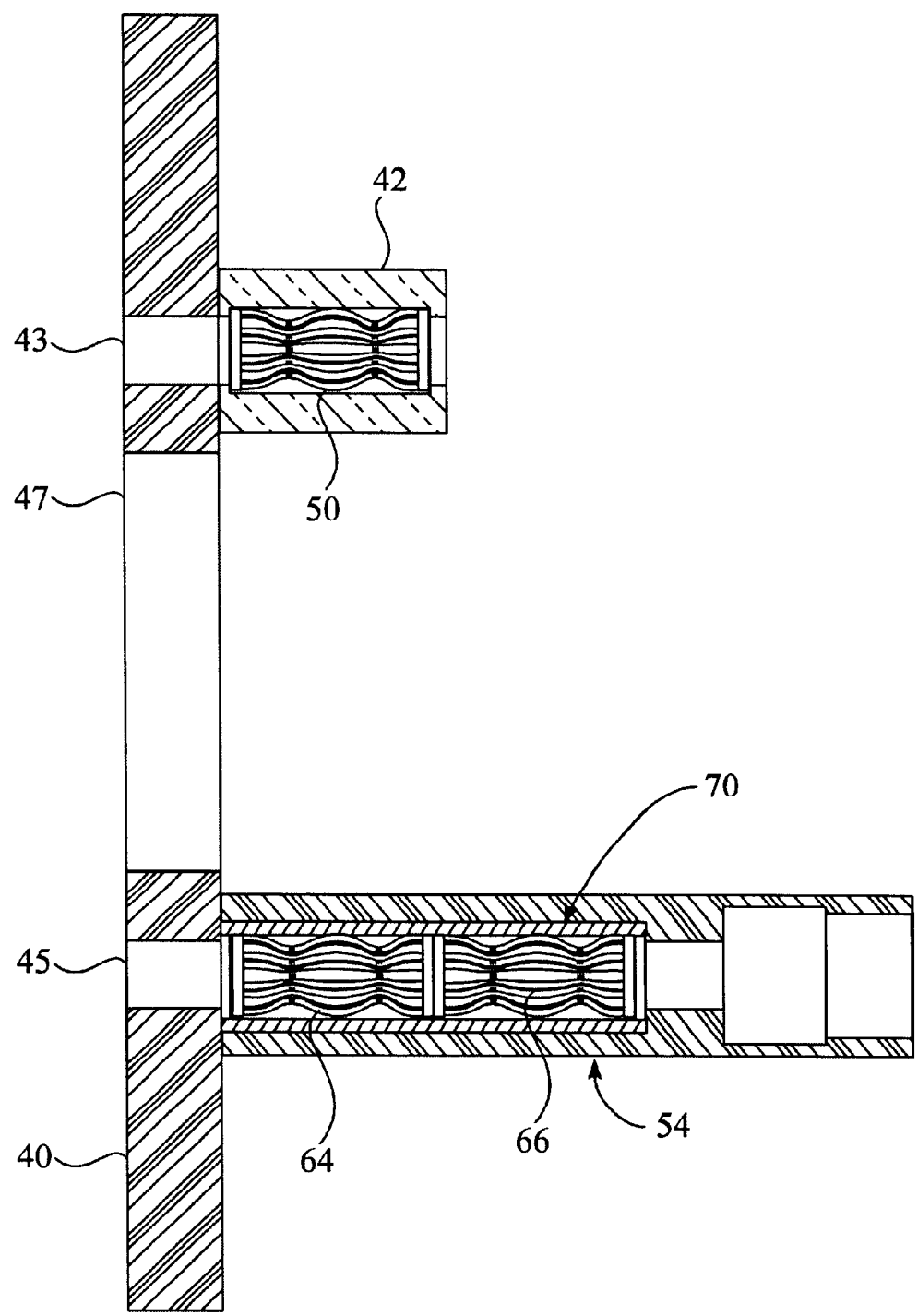
FIG. 15 is an enlarged cross-sectional view taken along line 8—8 of FIG. 6.
Figure 16:
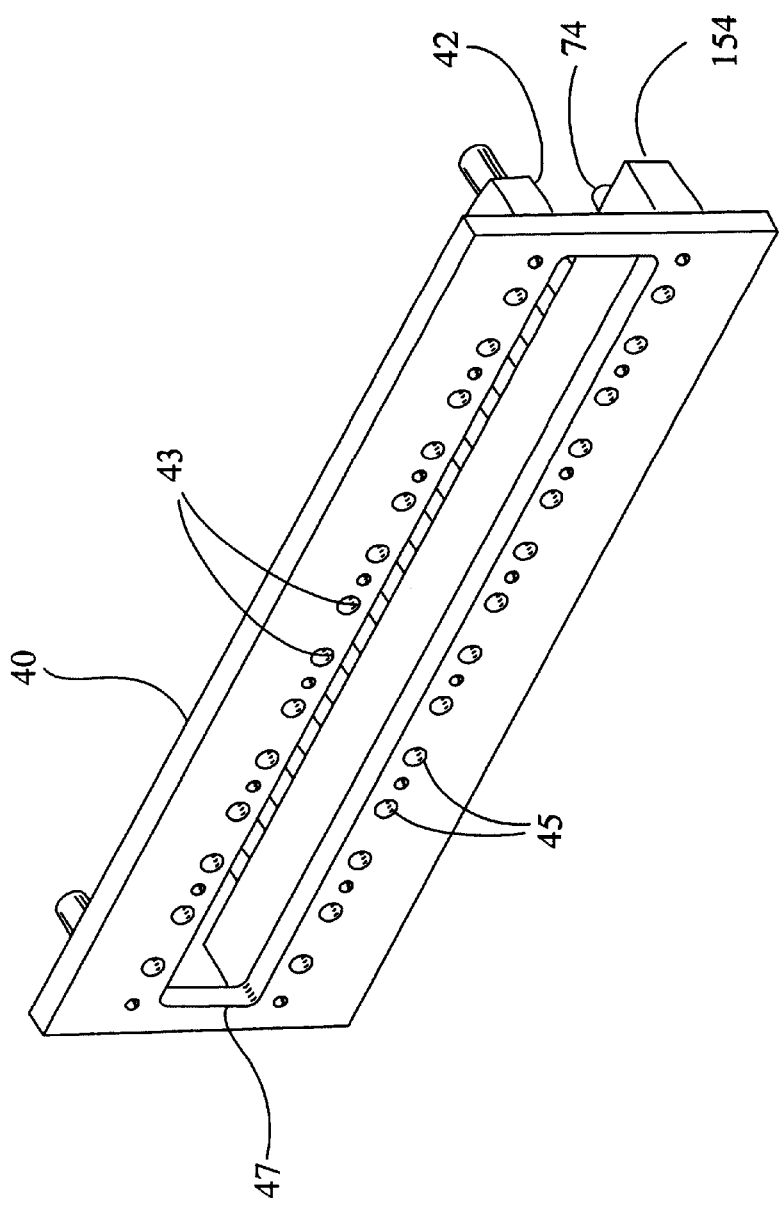
FIG. 16 is a front perspective view of a circuit breaker bus bar assembly in accordance with a second embodiment of the present invention.
Figure 17:
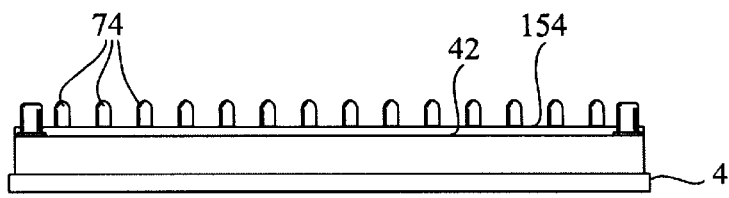
FIG. 17 is a top plan view of the circuit breaker panel assembly of FIG. 16.
Figure 18:
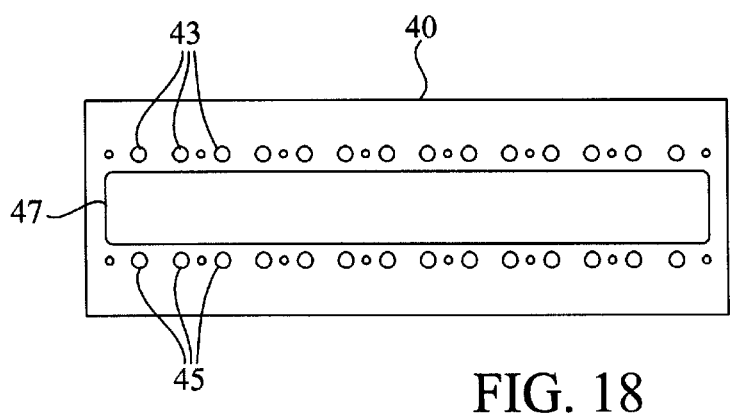
FIG. 18 is a front elevational view of the circuit breaker bus bar assembly of FIG. 16.
Figure 19:
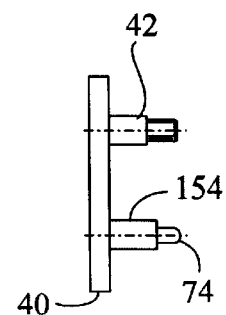
FIG. 19 is a right side elevational view of the circuit breaker bus bar assembly of FIG. 16.
Figure 20:
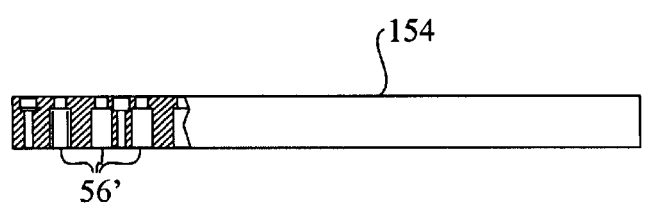
FIG. 20 is a top plan partial cross-sectional view of an insulated housing of FIG. 16.
Figure 21:
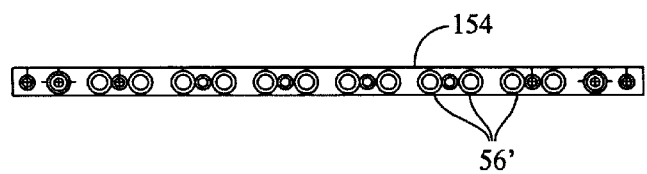
FIG. 21 is a front elevational view of the insulated housing of FIG. 20.
Figure 22:
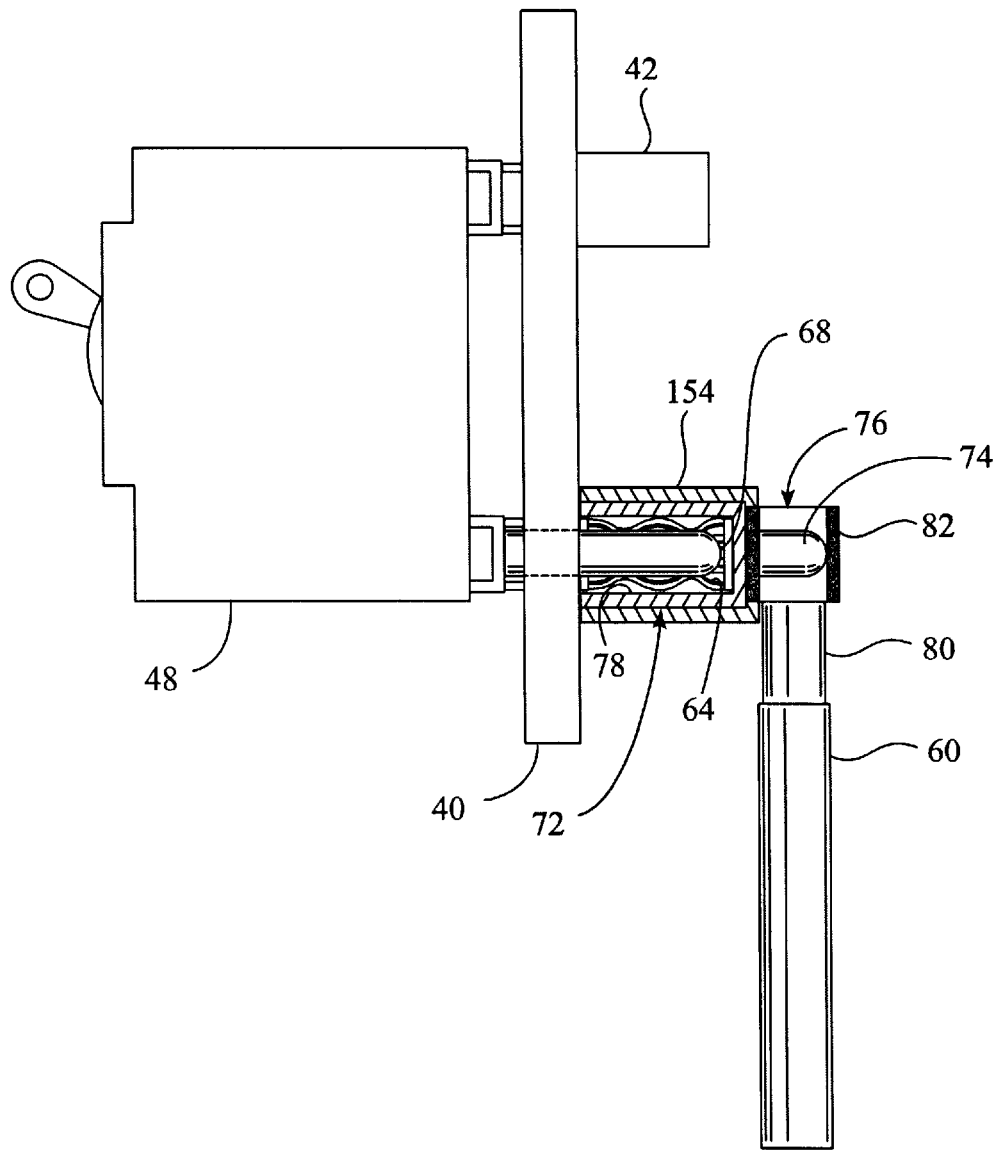
FIG. 22 is a right side elevational partial cut-away view of the circuit breaker bus bar assembly of FIG. 16.
Figure 23:
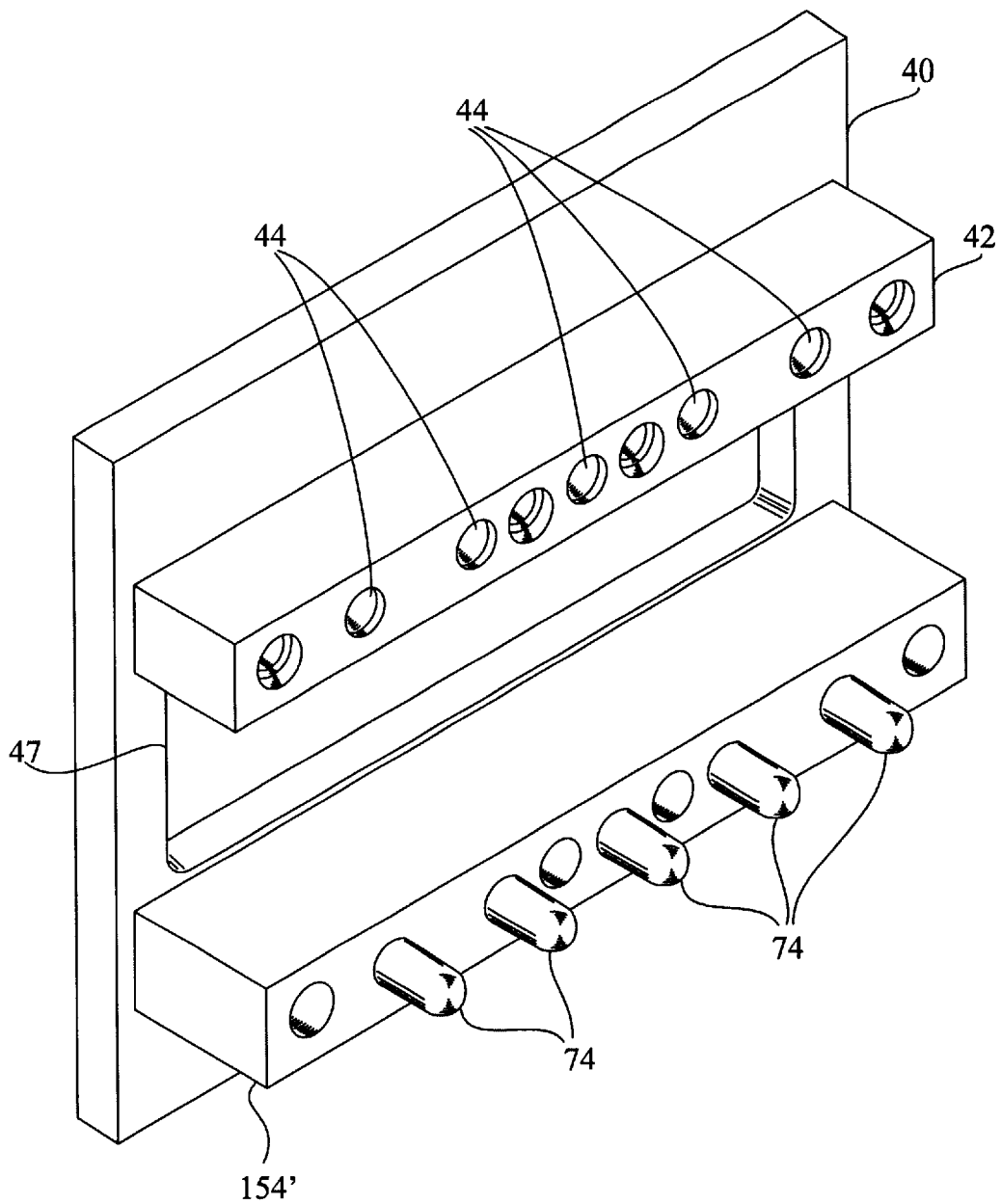
FIG. 23 is a rear perspective view of the circuit breaker bus bar assembly of FIG. 16.
Figure 24:
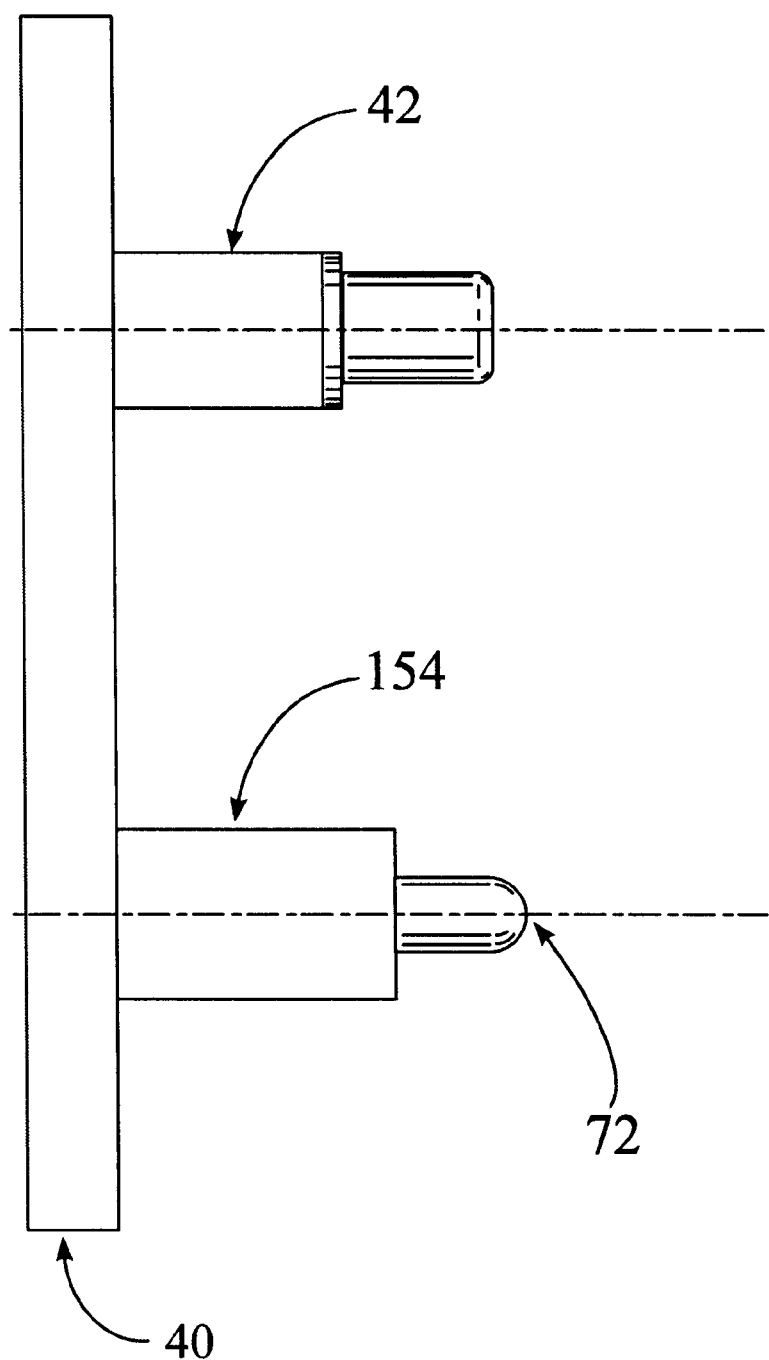
FIG. 24 is a right side elevational view of the circuit breaker bus bar assembly of FIG. 16.

Also attached to the rear side of circuit breaker panel 40 is electrically insulating housing 54 having a plurality of contact openings 56 in registration with holes 45 for receiving a plurality of crimped pin contacts 58. Each pin contact 58 is provided with a pin portion 59 which is in electrical communication with the electrical conductor of a corresponding contact wire 60 of an electrical circuit (not shown). Located within each contact opening 56 is a retaining clip 62 for removably retaining each of the pin contacts 58. Also located within contact openings 56 are electrical contact bands 64 and 66. Electrical contact band 64 receives circuit breaker contact post 68, which passes through a hole 45 in circuit breaker panel 40, and electrical contact band 66 receives pin portion 59 of pin contact 58. Each contact opening 56 also contains a cylindrical shroud, hood, or sleeve 70 of any electrically conductive material for housing each of the electrical contact bands 64 and 66. Sleeve 70, shown in FIGS. 9 and 10, provides both electrical and structural support for contact bands 64 and 66, serving to complete the electrical connection between the contact bands and to increase their current load capacity while providing the necessary rigidity to support the pluggable nature of the connections of the circuit breakers 48 and wires 60. Alternatively, connection between the posts 68 and corresponding pin contacts 58 can be effected using a unitary component, such as a thicker, elongated contact band disposed in contact openings 56, dispensing with the need for sleeve 70.

Figure 4:
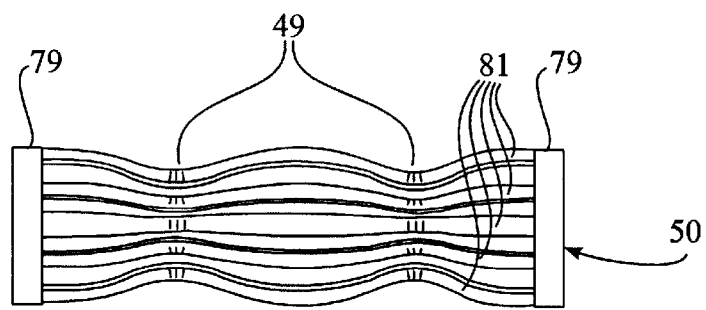
FIG. 4 is an perspective view of a contact band in accordance with the invention.
Figure 5:
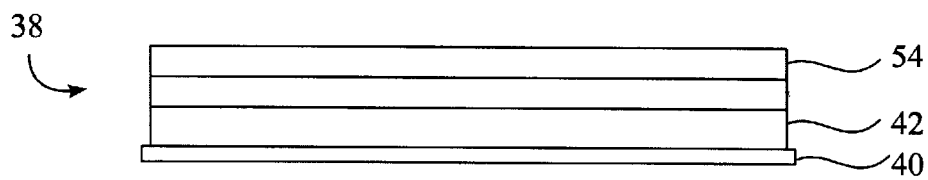
FIG. 5 is a top plan view of the circuit breaker panel assembly of FIG. 3.
Figure 8:
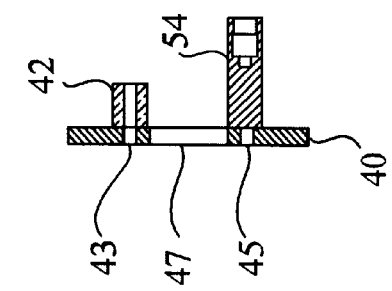
FIG. 8 is a cross-sectional view taken line 8—8 of FIG. 6.
Figure 7:
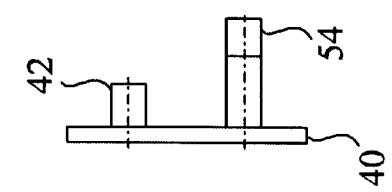
FIG. 7 is a right side elevational view of the circuit breaker panel assembly of FIG. 3.

The electrical contact bands 50, 64 and 66 each have a "double crown" body, best illustrated in FIG. 4, wherein the generally cylindrical shape of the contact bands is provided with two constricted circumference regions 49, with the resilient nature of the selected conductive material of the contact bands and the constricted circumference regions 49 operating to insure secure mechanical and electrical contact with the inserted posts 46 and 68 and pin portion 59. One possible material for the contact bands is a beryllium-copper alloy. The contact band has first and second engagement portions 79 at its ends which serve to support the contact band in place within the associated contact opening (or sleeve 70 or socket portion 78 of pin contact 72), and to receive the pins or posts to be plugged thereinto. Interiorly of the engagement portions 79, the structure of the contact band is in the form of resilient contact members or fingers 81 generally dimensioned to spring fit into the contact openings and around the pins to form a secure electrical and mechanical connection at least at the constricted circumference regions 49.

Insulating housing 54 is formed of electrically non-conducting material, such as any suitable polymer for example, which maintains electrical isolation of each pin contact (58)-contact post (68)-contact wire (60) combination Locating the electrical contact bands 64 and 66 within insulated housing 54 and electrical contact bands 50 within conducting ground bus bar or common housing 42 provides pluggability of the circuit breaker 48 and each of the pin contacts 58 and attendant wires 60, while eliminating the possibility of any damage from a crucial part of the electrical connection, namely the electrical contact bands. This embodiment of the invention provides for a pluggable, removable electrical connection for the crimped pin contact 58. Likewise, there are pluggable connections for the posts 46 and 68 of the circuit breaker 48 for quick-release, quick-insert connections with substantially no risk of damage or loss to any of the electrical contact bands 50, 64 and 66.

FIGS. 16–26 illustrate a second embodiment of a circuit breaker bus bar assembly in accordance with the present invention. The embodiment of FIGS. 16–26 provides the same pluggable modularity and protected electrical contacts as described with respect to the first embodiment. However, in the second embodiment, a different electrical coupling arrangement housed in a different insulated housing 154 is used. Insulated housing 154 is formed of any suitable electrically insulating material and is provided with contact openings 156 in registry with holes 45 of circuit breaker panel 40. Disposed within contact openings 156 are pin contacts 72 which are each comprised of a socket portion 78 and a post portion 74, both of which are made of an electrically conductive material and are in electrical contact with each other. Post portion 74 at least partially extends beyond the insulated housing 154 for pluggably mating with a socket contact 76 in electrical communication with the conductor of wire 60. The socket portion 78 of each pin contact 72 houses therein an electrical contact band 64 for receiving the circuit breaker post 68 of the circuit breaker 48. The socket contact 76 has a crimp barrel 80 attached to one side thereof for crimping onto wire 60, and an electrical contact band (not shown) within a housing 82 for making electrical contact with the post portion 74 when the post portion is inserted into the socket contact 76. In this manner an electrical path is established between the post 68 of circuit breaker 48 and the conductor in wire 60, the electrical path relying on contact between post 68, contact band 64, socket portion 78 and post portion 74 of pin contact 72, the contact band in socket contact 76 (not shown), and the conductor in wire 60. The pin contact 72 of this type electrically and structurally supports electrical contact band 64 disposed in socket portion 78 thereof while providing a pluggable, snap-action, right angle attachment for the wire 60.

Figure 25:
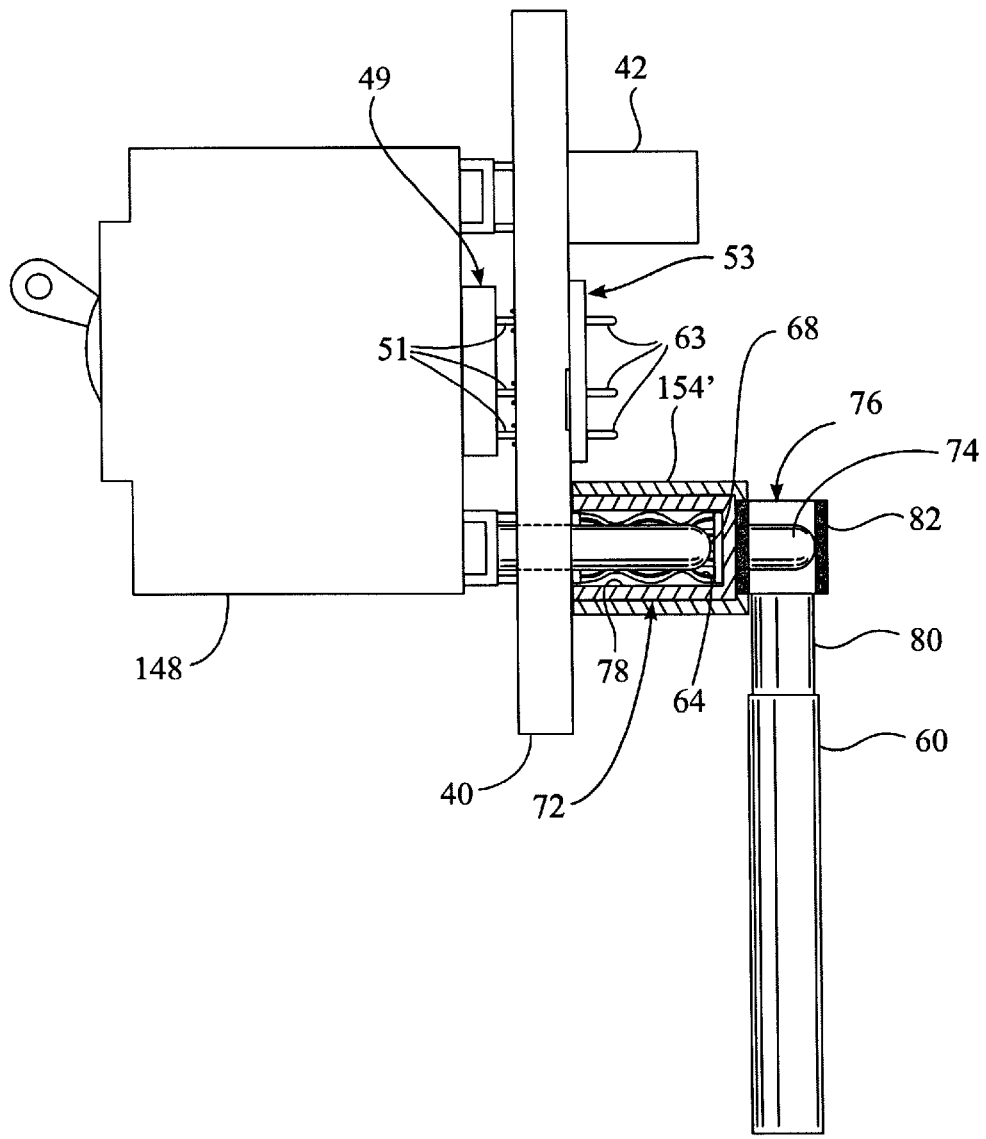
FIG. 25 is a right side elevational partial cut-away view of the circuit breaker bus bar assembly having an auxiliary terminal connector in accordance with the invention.
Figure 26:
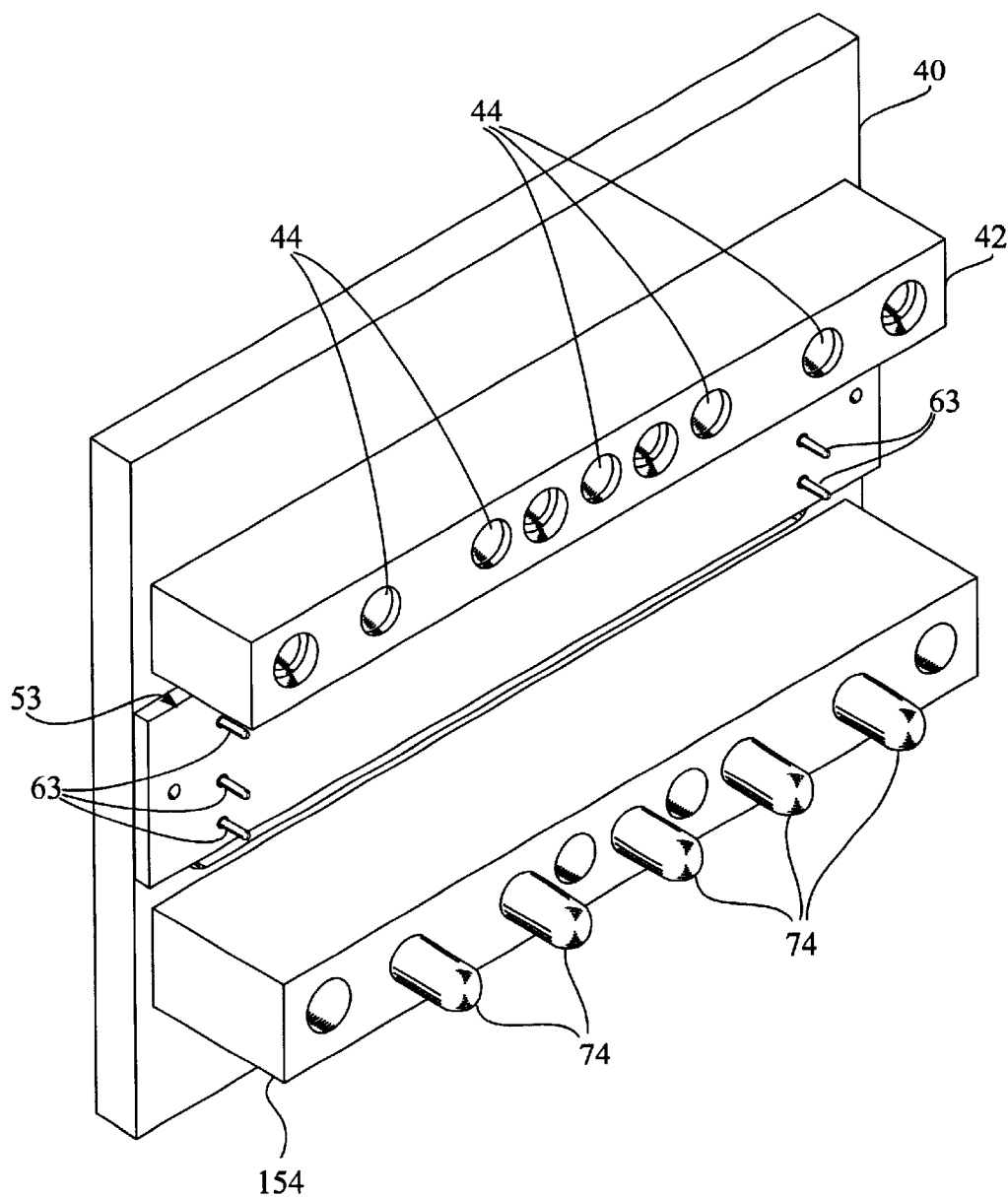
FIG. 26 is a rear perspective view of the circuit breaker bus bar assembly of FIG. 25.
Figure 27:
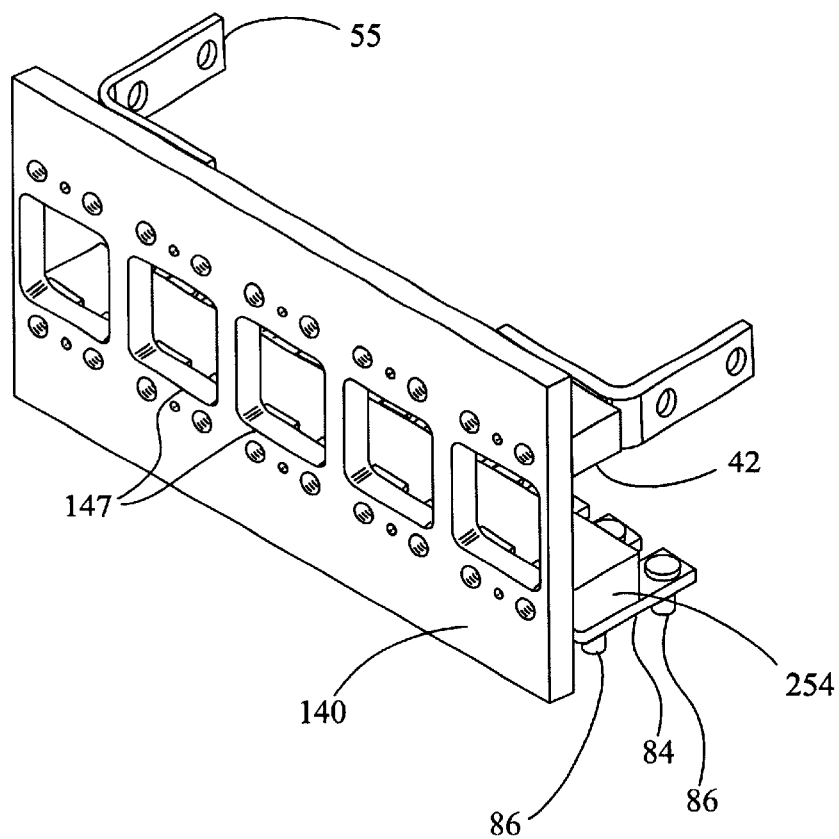
FIG. 27 is a front perspective view of circuit breaker bus bar assembly in accordance with a third embodiment of the present invention.
Figure 38:
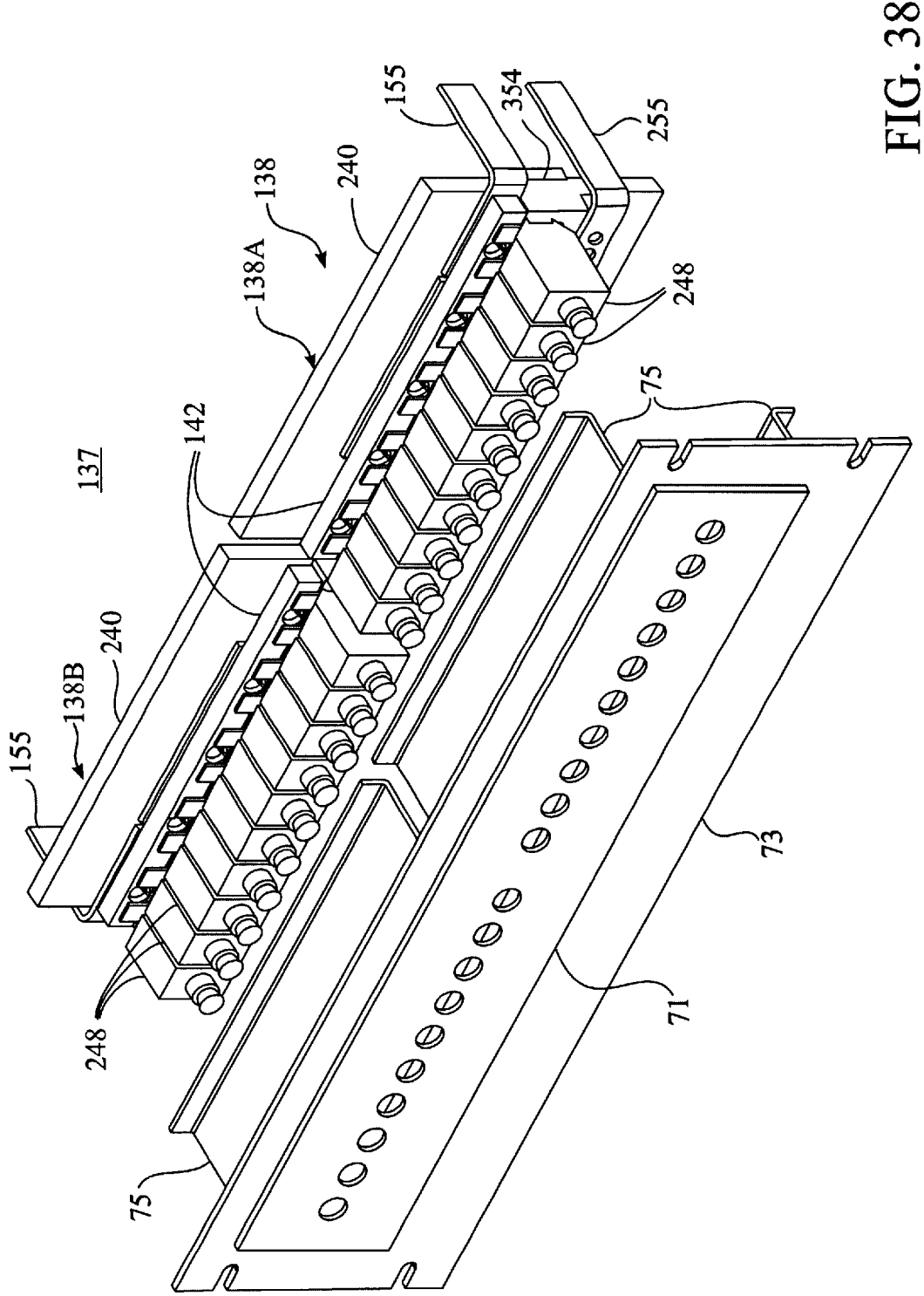
FIG. 38 is an exploded perspective view of a pair of circuit breaker bus bar assemblies in accordance with a fourth embodiment of the invention.
Figure 39:
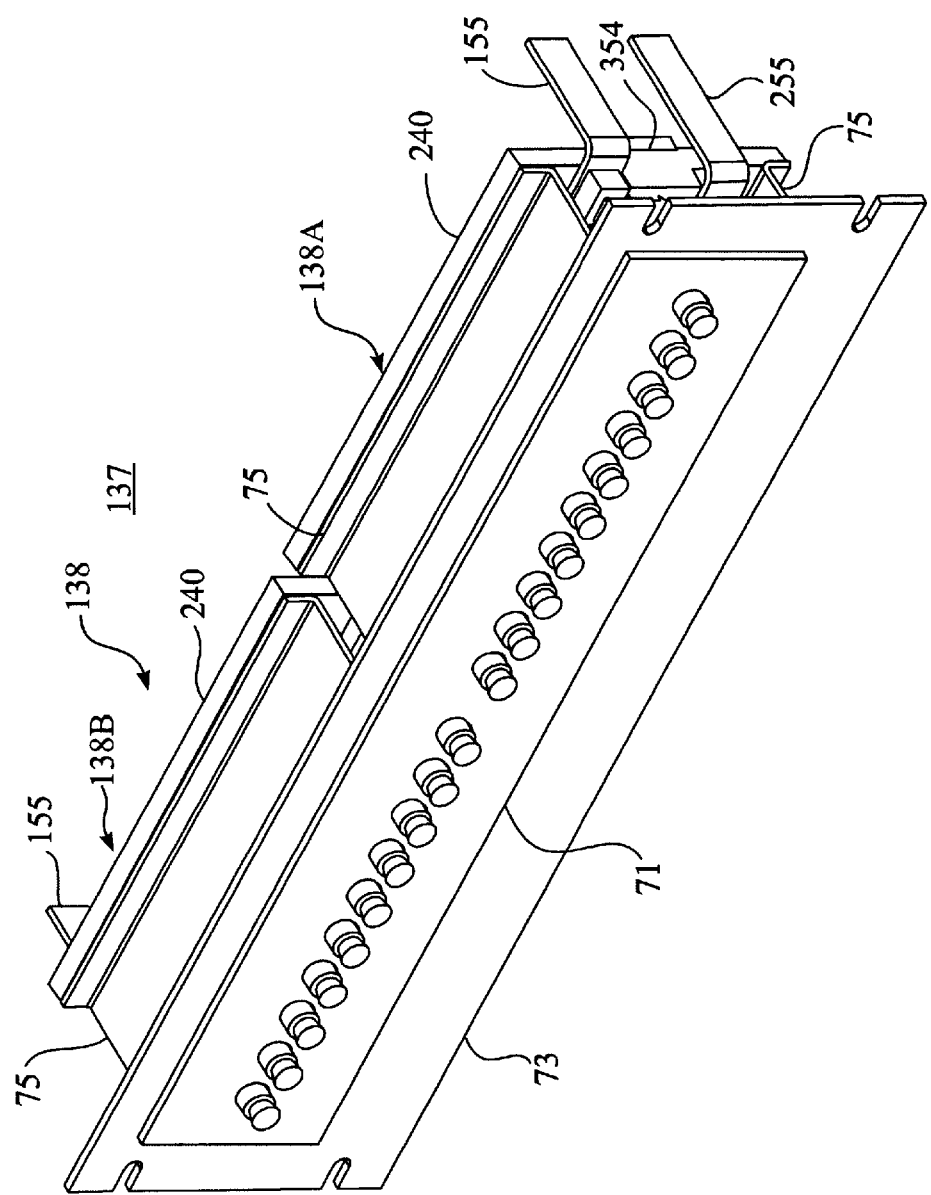
FIG. 39 is a perspective view of the circuit breaker bus bar assemblies of FIG 38.
Figure 40:
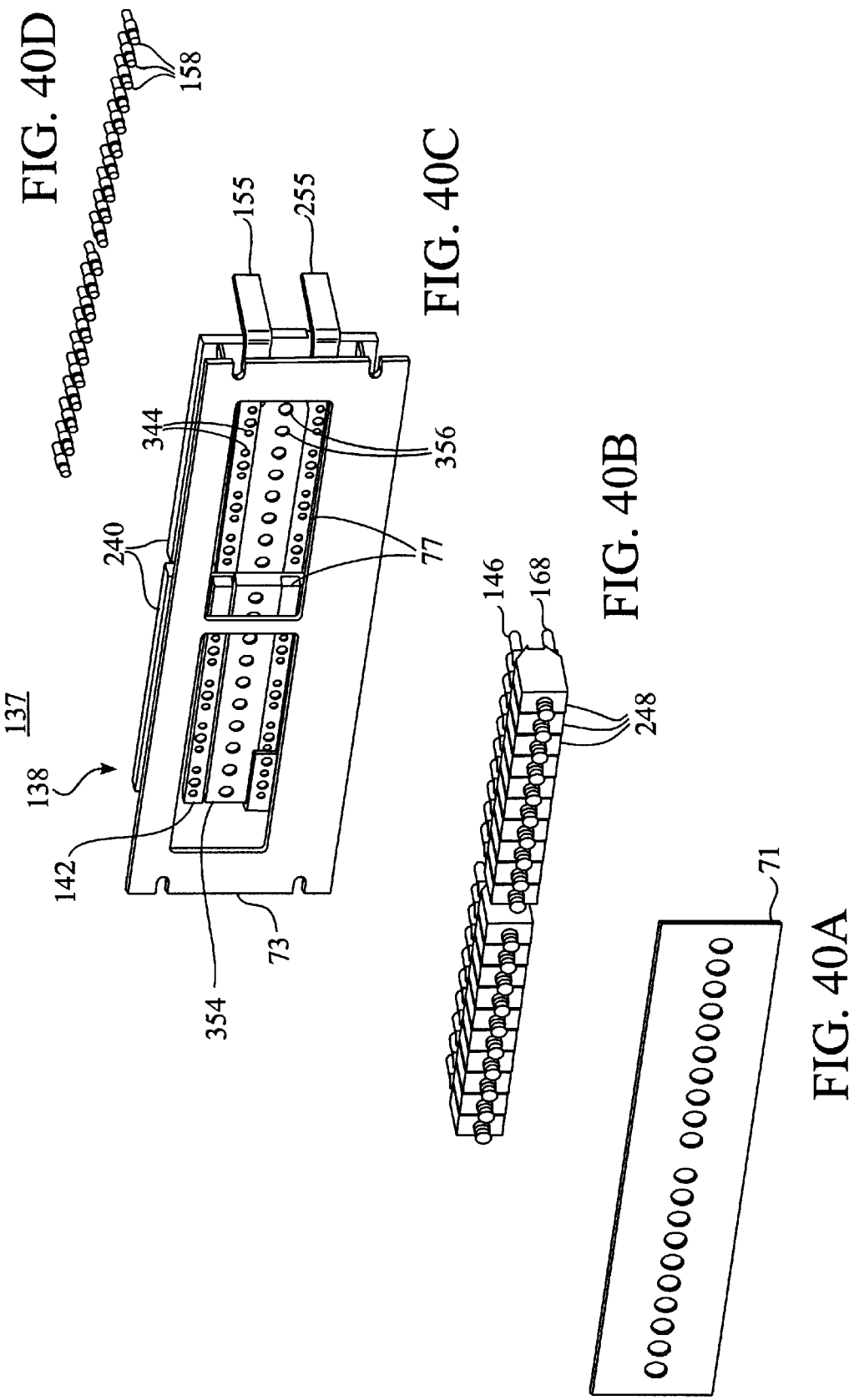
FIGS. 40A–40D are exploded perspective views of the circuit breaker bus bar assemblies of FIG. 38.

FIGS. 25 and 26 show an arrangement in accordance with the second embodiment, but in use with a type of circuit breaker 148 having a signaling module 49 attached to one face thereof. Signaling module 49 is used to provide signals indicative of the status of each circuit breaker 148—that is, whether the circuit breaker 148 has been tripped or not. To accommodate the signaling module 49, signaling pins 51 protruding therefrom are passed through circuit breaker panel 40 via slot 47 provided therein. Mounted on the rear side of circuit breaker panel 40 is an auxiliary terminal connector 53 adapted to pluggably receive signaling pins 51 when the circuit breaker 148 is plugged into place. Auxiliary terminal connector 53 serves to bus signal from the circuit breakers 148 to one or more common locations, such as terminals 63, to facilitate monitoring of circuit breaker status in the assembly.

FIGS. 27–37 illustrate an arrangement in accordance with a third embodiment of the present invention. The principle distinction of the third embodiment over the previous embodiments is that L-shaped brackets 84 having two threaded posts 86 extending outward therefrom are attached to the contact sleeves 170, which are similar to sleeves 70 described previously and are disposed in contact openings 256 (FIGS. 34 and 35) of housing 254. Each sleeve 170 is provided with a threaded portion 57 (FIG. 31) for threading into threaded holes 61 provided in brackets 84 for attachment thereto. Threaded portions 57 at least partially protrude from insulated housing 254 for mating with holes 61 of L-shaped brackets 84, with a portion of each L-shaped bracket 84 extending outward from housing 254 to expose posts 86 adapted for use with conventional lug-type terminal connections. Circuit breaker panel 140 is shown with modified slots 147 which accommodate a pair of circuit breakers (not shown) in each slot. Power brackets 55, shown in FIG. 27, may be provided for support and connection of the assembly.

FIGS. 38–43 illustrate an arrangement in accordance with a fourth embodiment of the present invention. As seen in FIGS. 38–43, a different form factor of the circuit breakers 248 is accommodated in the modular circuit breaker mounting system 137. Referred to conventionally as level 4 type circuit breakers, circuit breakers 248 are designed to be earthquake proof and are generally smaller in size than those described above. Each circuit breaker 248 is provided with a pair of posts 146 and 168 (FIG. 40B) designed to plug into the associated circuit breaker bus bar assembly 138. Two such assemblies, 138A and 138B are disclosed as comprising system 137, but it is to be understood that other numbers of assemblies can be used.

Assembly 138A comprises a circuit breaker panel 240 on which is mounted housing 142 formed of a conducting material, preferably copper, and serving to receive posts 146 of circuit breakers 248 and electrically connect these posts together. Housing 142 contains therein a plurality of contact openings 344 each housing therein, in the manner described above, a contact band (not shown) adapted to receive an associated post 146. Housing 142 is connected electrically to conducting bracket 155 for common access to one of the positive or negative terminals of the main power circuit (not shown), or to ground.

Assembly 138A also comprises a second, insulating housing 354 for receiving posts 168 of circuit breakers 248 and maintaining these in electrical isolation from each other. In a manner similar to that described above, housing 354 is provided with a plurality of contact openings 356 each containing therein a pair of contact bands (not shown) optionally housed in a suitable sleeve. The contact bands in the second housing respectively pluggably mate with a post 168 and a pin contact 158 of a wire of an associated circuit (not shown).

Optionally, a third housing 77 (see FIG. 40C), formed of a conducting material, serves to receive the return wires (not shown) from the associated circuits and commonly couple these, via brackets 255, to the other of the positive or negative terminals of the main power circuit (not shown), or to ground.

Assemblies 138A and 138B and the associated circuit breakers 248 are protected behind a pair of faceplates 71 and 73 and are connected thereto by brackets 75. Access to circuit breakers 248, for pluggable replacement thereof, is gained by removal of face plate 71.

As mentioned above, all the embodiments described previously can be used in a modular fashion to accommodate any number N of circuit breakers. For example, FIG. 2 illustrates seven circuit breakers 48 being used in a circuit breaker bus bar assembly 38A that can accommodate a set M of up to 12 circuit breakers with M≦N. The circuit breaker bus bar assembly 38A can be provided in different sizes, for example, 4, 6, 10, 12 (as shown in FIG. 2), and 14, any of which can be combined with any other size circuit breaker bus bar assembly using coupling wires and assemblies 52. As will be appreciated by the reading of the above disclosure, the present invention provides a circuit breaker and bus bar assembly that has a protected electrical contact band for providing improved performance and reliability in the design of circuit breakers and circuit breaker panel assemblies. Another principle advantage of the present invention is that a larger circuit panel and bus bar assembly than is currently needed can be incorporated into a design without having to utilize all of the circuit breakers and the attendant capital equipment cost in the early generation of the design, but subsequently the system can be upgraded by using the unused portions of the circuit panel and bus bar assembly. In other words, if initially only six circuit breakers are required for a design, but the possibility exists that the design may eventually require 12 circuit breakers, a 12-slot circuit breaker panel assembly in accordance with the present invention with only six circuit breakers plugged into the assembly can be used. Then, as more circuit breakers are required, the additional circuit breakers can be quickly plugged into the existing panel to provide a quick and easy upgrade.

The above are exemplary modes of carrying out the invention and are not intended to be limiting. It will be apparent to those skilled in the art that modifications thereto can be made without departure from the spirit and scope of the invention as set forth in the following claims.

What is claimed is:

1. A circuit breaker mounting system for electrically connecting at least one circuit breaker having first and second breaker posts to at least one circuit, the circuit breaker mounting system comprising at least one circuit breaker bus bar assembly having a first housing provided with at least one first electrically conducting contact band mounted therein and adapted to receive the first circuit breaker post and a second housing provided with at least one second electrically conducting contact band mounted therein and adapted to receive the second circuit breaker post for establishing an electrical connection between the second circuit breaker post and the corresponding circuit, the second housing being provided with at least one third electrically conducting contact band mounted therein and the circuit being electrically connected to a pin contact adapted for insertion into the third electrically conducting contact band.

2. The circuit breaker mounting system of claim 1, further comprising at least one conducting sleeve mounted in the second housing, the second and third electrically conducting contact bands being mounted in said sleeve, said sleeve providing electrical communication between the second and third electrically conducting contact bands.

3. The circuit breaker mounting system of claim 2, wherein the contact bands are generally cylindrical in shape and comprise a resilient material having two constricted circumference regions.

4. The circuit breaker mounting system of claim 1, further comprising a retaining clip mounted in the second housing for removably retaining the pin contact.

5. A circuit breaker mounting system for electrically connecting at least one circuit breaker having first and second circuit breaker posts to at least one circuit, the circuit breaker mounting system comprising at least one circuit breaker bus bar assembly having a first housing provided with at least one first electrically conducting contact band mounted therein and adapted to receive the first circuit breaker post and a second housing provided with at least one second electrically conducting contact band mounted therein and adapted to receive the second circuit breaker post for establishing an electrical connection between the second circuit breaker post and the corresponding circuit, at least one electrically conducting pin contact rigidly mounted in the second housing, the pin contact having a socket portion in which is mounted the second electrically conducting contact band and a post portion electrically connected to the socket portion and extending outwardly from the second housing.

6. The circuit breaker mounting system of claim 1, further comprising a socket contact electrically connected to the circuit, the socket contact adapted to receive said post portion therein for establishing an electrical connection between the post portion and the circuit.

7. A circuit breaker mounting system for electrically connecting at least one circuit breaker having first and second circuit breaker posts to at least one circuit, the circuit breaker mounting system comprising at least one circuit breaker bus bar assembly having a first housing provided with at least one first electrically conducting contact band mounted therein and adapted to receive the first circuit breaker post and a second housing provided with at least one second electrically conducting contact band mounted therein and adapted to receive the second circuit breaker post for establishing an electrical connection between the second circuit breaker post and the corresponding circuit, the at least one circuit breaker being provided with a signaling module having signaling pins for providing signals indicative of the status of the circuit breaker, the circuit breaker mounting system further comprising an auxiliary terminal connector located between the first and second housings for receiving the signaling pins and electrically connecting the signaling pins to one or more corresponding terminals.

8. A circuit breaker mounting system for electrically connecting at least one circuit breaker having first and second circuit breaker posts to at least one circuit, the circuit breaker mounting system comprising at least one circuit breaker bus bar assembly having a first housing provided with at least one first electrically conducting contact band mounted therein and adapted to receive the first circuit breaker post and a second housing provided with at least one second electrically conducting contact band mounted therein and adapted to receive the second circuit breaker post for establishing an electrical connection between the second circuit breaker post and the corresponding circuit, at least one electrically conducting post mounted exteriorly of the second housing and means for electrically connecting the conducting post to the second electrically conducting contact band.

9. The circuit breaker mounting system of claim 8, further comprising at least one conducting sleeve mounted in the second housing, the sleeve containing therein the second electrically conducting contact band, the means for electrically connecting the conducting post comprising a conducting bracket connected to the sleeve.

10. A circuit breaker mounting system for electrically connecting at least first and second circuit breakers having respective first and second circuit breaker posts to at least one circuit, the circuit breaker mounting system comprising at least one circuit breaker bus bar assembly having a first housing provided with at least one first electrically conducting contact band mounted therein and adapted to receive the first circuit breaker post and a second housing provided with at least one second electrically conducting contact band mounted therein and adapted to receive the second circuit breaker post for establishing an electrical connection between the second circuit breaker post and the corresponding circuit, the first housing electrically connecting the first posts of the at least first and second circuit breakers.

11. A circuit breaker bus bar assembly for receiving one or more pluggable circuit breakers having respective first and second electrically conducting posts for connecting the one or more pluggable circuit breakers to one or more wires, the circuit breaker bus bar assembly comprising a panel and first and second housings mounted on said panel, the first housing having at least one first contact opening corresponding to the first circuit breaker post of an associated circuit breaker and the second housing having at least one second contact opening corresponding to the second circuit breaker post of the associated circuit breaker, a first electrically conducting contact band being mounted in the at least one first contact opening for receiving the first circuit breaker post of the associated circuit breaker and a second electrically conducting contact band being mounted in the least one second contact opening for receiving the second circuit breaker post of the associated circuit breaker, the second contact opening being provided with a third electrically conducting contact band mounted therein and the corresponding wire being electrically connected to a pin contact having a pin portion extending therefrom adapted for insertion into the third electrically conducting contact band.

12. The circuit breaker mounting system claim 11, further comprising a conducting sleeve mounted in the second contact opening, the second and third electrically conducting contact bands being mounted end to end in said conducting sleeve, said sleeve providing electrical communication between the second and third electrically conducting contact bands.

13. The circuit breaker mounting system of claim 12, wherein the contact bands are generally cylindrical in shape and comprise a resilient material having two constricted circumference regions.

14. A circuit breaker mounting system for receiving one or more pluggable circuit breakers having respective first and second electrically conducting posts for connecting the one or more pluggable circuit breakers to one or more wires, the circuit breaker bus bar assembly comprising a panel and first and second housing mounted on said panel, the first housing having at least one first contact opening corresponding to the first circuit breaker post of an associated circuit breaker and the second housing having at least one second contact opening corresponding to the second circuit breaker post of the associated circuit breaker, a first electrically conducting contact band being mounted in the at least one first contact opening for receiving the first circuit breaker post of the associated circuit breaker and a second electrically conducting contact band being mounted in the least one second contact opening for receiving the second circuit breaker post of the associated circuit breaker, an electrically conducting pin contact rigidly mounted in the second contact opening and having a socket portion in which is mounted the second electrically conducting contact band and a post portion electrically connected to the socket portion and extending outwardly from the second housing.

15. The circuit breaker mounting system of claim 14, further comprising a socket contact secured to the corresponding wire, the socket contact adapted to pluggably receive said post portion for establishing an electrical connection between the post portion and the wire.

16. A circuit breaker mounting system for receiving one or more pluggable circuit breakers having respective first and second electrically conducting posts for connecting the one or more pluggable circuit breakers to one or more wires, the circuit breaker bus bar assembly comprising a panel and first and second housings mounted on said panel, the first housing having at least one first contact opening corresponding to the first circuit breaker post of an associated circuit breaker and the second housing having at least one second contact opening corresponding to the second circuit breaker post of the associated circuit breaker, a first electrically conducting contact band being mounted in the at least one first contact opening for receiving the first circuit breaker post of the associated circuit breaker and a second electrically conducting contact band being mounted in the least one second contact opening for receiving the second circuit breaker post of the associated circuit breaker, the circuit breaker being provided with a signaling module having signaling pins for providing signals indicative of the status of the circuit breaker, the panel having mounted thereon an auxiliary terminal connector for pluggably receiving the signaling pins of the circuit breaker and electrically connecting the signaling pins to one or more corresponding terminals.

17. A circuit breaker mounting system for receiving one or more pluggable circuit breakers having respective first and second electrically conducting posts for connecting the one or more pluggable circuit breakers to one or more wires, the circuit breaker bus bar assembly comprising a panel and first and second housings mounted on said panel, the first housing having at least one first contact opening corresponding to the first circuit breaker post of an associated circuit breaker and the second housing having at least one second contact opening corresponding to the second circuit breaker post of the associated circuit breaker, a first electrically conducting contact band being mounted in the at least one first contact opening for receiving the first circuit breaker post of the associated circuit breaker and a second electrically conducting contact band being mounted in the least one second contact opening for receiving the second circuit breaker post of the associated circuit breaker, an electrically conducting post associated with the second contact opening and mounted exteriorly of the second housing and means for electrically connecting the second electrically conducting contact band to the associated electrically conducting post.

18. The circuit breaker mounting system of claim 11, further comprising a conducting sleeve mounted in the second contact opening, the sleeve containing therein the second electrically conducting contact band, the means for electrically connecting comprising a conducting bracket connected to the sleeve.

19. The circuit breaker mounting system of claim 18, wherein the bracket is threadably mounted to the sleeve.

20. A circuit breaker assembly for use with one or more wires comprising one or more pluggable circuit breakers having respective first and second electrically conducting posts adapted for connecting the one or more pluggable circuit breakers to the one or more wires, a panel and first and second housings mounted on said panel, the first housing having at least one first contact opening corresponding to the first circuit breaker post of an associated circuit breaker and the second housing having at least one second contact opening corresponding to the second circuit breaker post of the associated circuit breaker, a first electrically conducting contact band being mounted in the at least one first contact opening for receiving the first circuit breaker post of the associated circuit breaker and a second electrically conducting contact band being mounted in the least one second contact opening for receiving the second circuit breaker post of the associated circuit breaker, each of the one or more circuit breakers being a level 4 type earthquake proof circuit breaker.

21. A circuit breaker mounting system for electrically connecting a plurality of circuit breakers having respective first and second circuit breaker posts to a plurality of circuits, the circuit breaker mounting system comprising at least one circuit breaker bus bar assembly having a first housing provided with at least one first electrically conducting contact band mounted therein and adapted to receive the first circuit breaker posts and a second housing provided with at least one second electrically conducting contact band mounted therein and adapted to receive the second circuit breaker posts for establishing respective electrical connections between the second circuit breaker posts and the circuits, the first and second electrically conducting contact bands each having a plurality of circumferentially spaced-apart contact members for enhancing electrical connections with the respective first circuit breaker posts, the first housing being made from a conductive material for electrically coupling together the first circuit breaker posts.

22. The circuit breaker mounting system of claim 21 wherein the first housing is a common bus bar.

23. The circuit breaker mounting system of claim 21 wherein the first housing is a ground bus bar.

* * * * *